United States Patent [19]
Cubukciyan et al.

[11] Patent Number: 5,101,463
[45] Date of Patent: Mar. 31, 1992

[54] PUSH-PULL OPTICAL FIBER CONNECTOR

[75] Inventors: Nuran Cubukciyan, Englewood Cliffs; Albert Gennaro, Patterson; Raymond R. Nering, Fanwood; Julius T. Puchammer, Edison, all of N.J.

[73] Assignee: Minnesota Mining and Manufacturing Company, St. Paul, Minn.

[21] Appl. No.: 692,946

[22] Filed: May 3, 1991

[51] Int. Cl.⁵ ............................................. G02B 6/38
[52] U.S. Cl. .................................... 385/72; 385/69; 385/71; 385/84; 385/87
[58] Field of Search ............... 350/96.18, 96.20, 96.21, 350/96.22, 96.23

[56] References Cited

U.S. PATENT DOCUMENTS

| | | | |
|---|---|---|---|
| 3,803,409 | 4/1974 | Prochazka | 250/227.11 |
| 3,904,269 | 9/1975 | Labduska et al. | 350/96.20 X |
| 3,947,182 | 3/1976 | McCartney | 350/96.20 X |
| 3,948,582 | 4/1976 | Martin | 350/96.20 X |
| 4,185,886 | 1/1980 | Corrales | 350/96.21 |
| 4,190,316 | 2/1980 | Malsby et al. | 350/96.18 |
| 4,225,214 | 9/1980 | Hodge et al. | 350/96.21 |
| 4,240,695 | 12/1980 | Evans | 350/96.21 |
| 4,268,115 | 1/1981 | Slemon et al. | 350/96.21 |
| 4,272,154 | 6/1981 | Bachel | 350/96.22 |
| 4,327,964 | 5/1981 | Haesly et al. | 350/96.20 |
| 4,354,731 | 10/1982 | Mouissie | 350/96.21 |
| 4,429,938 | 2/1984 | Flor | 339/90 R |
| 4,486,072 | 12/1984 | Roberts | 350/96.21 |
| 4,526,431 | 7/1985 | Kasukawa | 339/45 R |
| 4,547,039 | 10/1985 | Caron et al. | 350/96.20 |
| 4,553,813 | 11/1985 | McNaughton et al. | 350/96.20 |
| 4,588,256 | 5/1986 | Onstott et al. | 350/96.21 |
| 4,611,887 | 10/1986 | Glover et al. | 350/96.21 |
| 4,634,214 | 1/1987 | Cannon, Jr. et al. | 350/96.20 |
| 4,673,242 | 6/1987 | Logan et al. | 350/96.20 |
| 4,687,291 | 8/1987 | Stape et al. | 350/96.21 |
| 4,690,495 | 9/1987 | Giannini | 350/96.21 |
| 4,762,388 | 8/1988 | Tanaka et al. | 350/96.20 |
| 4,762,389 | 8/1988 | Kaihara | 350/96.21 |
| 4,779,952 | 10/1988 | Hayashi et al. | 350/96.21 |
| 4,787,706 | 11/1988 | Cannon, Jr. et al. | 350/96.20 |
| 4,793,683 | 12/1988 | Cannon, Jr. et al. | 350/96.21 |
| 4,798,440 | 1/1989 | Hoffer et al. | 350/96.20 |
| 4,812,009 | 3/1989 | Carlisle et al. | 350/96.21 |
| 4,840,451 | 6/1989 | Sampson et al. | 350/96.20 |
| 4,852,963 | 8/1989 | Lampert | 350/96.20 |
| 4,872,736 | 10/1989 | Myers et al. | 350/96.20 |
| 4,898,446 | 2/1990 | Hinckley | 350/96.20 |
| 4,936,662 | 6/1990 | Griffin | 350/96.20 |
| 4,961,624 | 10/1990 | Savitsky et al. | 350/96.20 |
| 4,974,924 | 12/1990 | Okada et al. | 350/96.20 |
| 4,984,865 | 1/1991 | Lee et al. | 350/96.20 |
| 5,029,973 | 7/1991 | Rink | 350/96.21 |

FOREIGN PATENT DOCUMENTS

| | | | |
|---|---|---|---|
| 83302655.2 | 5/1983 | European Pat. Off. | 350/96.21 X |
| 54-148544 | 11/1979 | Japan | 350/96.21 X |

Primary Examiner—Brian Healy
Attorney, Agent, or Firm—Gary L. Griswold; Walter N. Kirn; Jack V. Musgrove

[57] ABSTRACT

A push-pull optical fiber connector which is compatible with ST-type receptacles. The connector includes a hollow, cylindrical backbone, a ferrule holder located in one end of the backbone, a ferrule affixed to the ferrule holder, a clamp at the other end of the backbone securing the strength member of the optical fiber to the backbone, and two flexible arms attached to the outer surface of the backbone having apertures which latch onto the bayonet lugs of the ST receptacle. A housing is further provided which surrounds and slides over the backbone. The housing has two slots therein for accommodating the latch arms, and ramp surfaces proximate the slots for engaging the leading edge of the latch arms. After the connector has been attached to the ST receptacle, it may be disconnected by simply pulling on the housing. The ramp surfaces then contact the latch arms, raising them and disengaging them from the receptacle lugs.

20 Claims, 2 Drawing Sheets

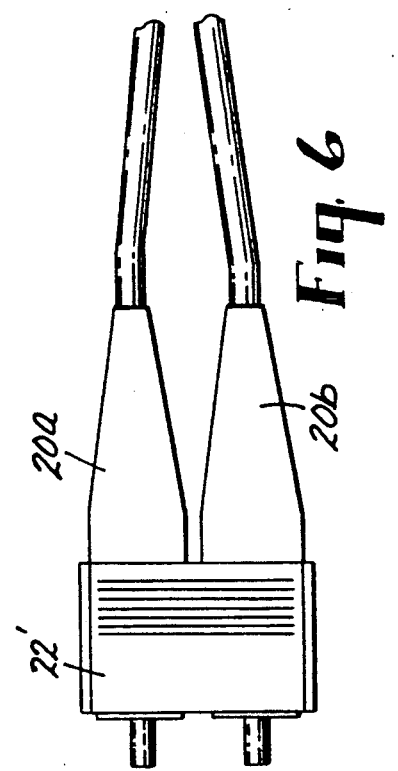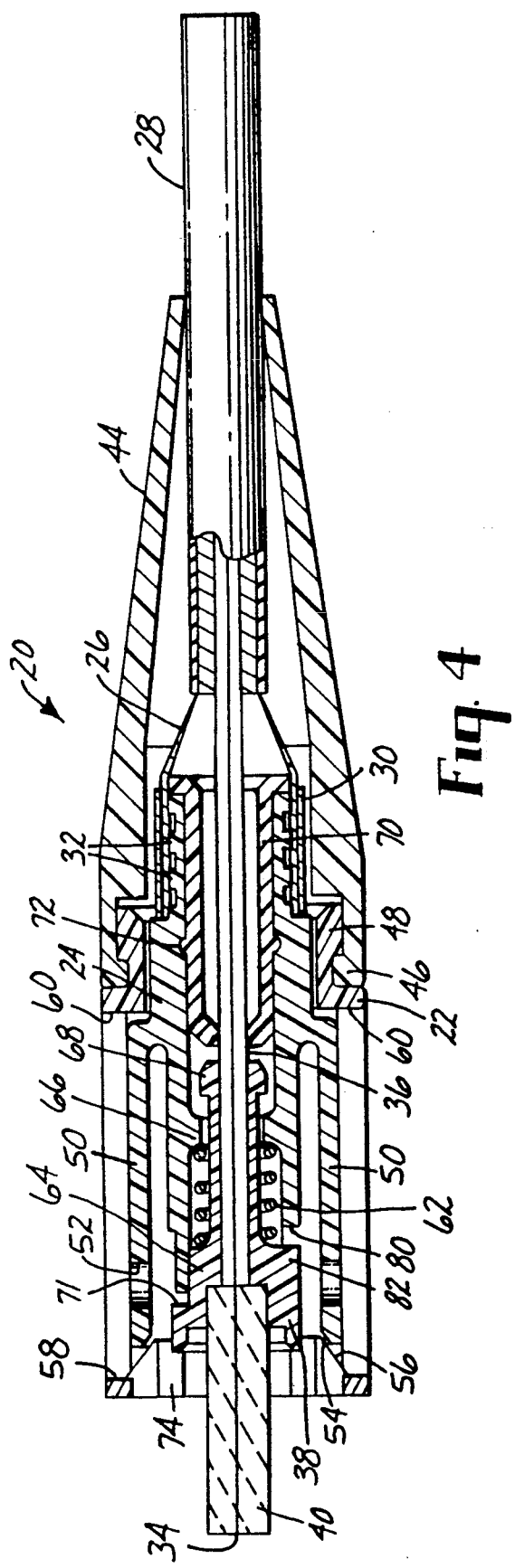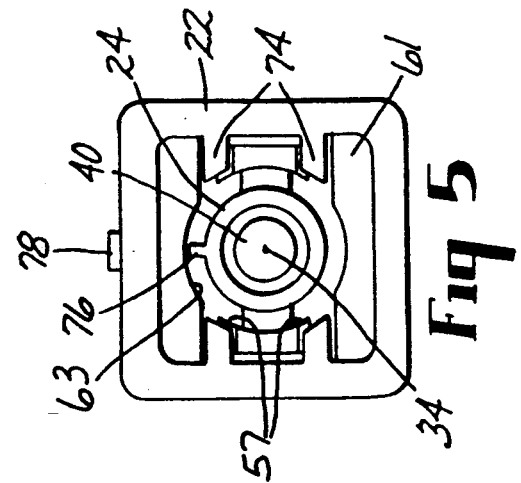

PUSH-PULL OPTICAL FIBER CONNECTOR

BACKGROUND OF THE INVENTION

1. Field of the Invention

The present invention generally relates to devices for connecting optical waveguides, and more particularly to a push-pull, quick-release optical fiber connector which is compatible with ST-type connector receptacles.

2. Description of the Prior Art

The use of optical fibers for high speed communication and data transmission via optical signals has become well established. There are already hundreds of thousands of miles of optical fiber in use today. It has, therefore, become imperative to provide compatible optical fiber connectors which may easily be coupled and uncoupled, and a substantial development effort has been directed toward designing such connectors. As used herein, the term "connector" means an article which allows connection, disconnection and reconnection of two optical fibers, as opposed to a "splice," which normally connotes a permanent connection between the fibers.

Several optical fiber connector designs have incorporated a bayonet-style fastener, such as that shown in U.S. Pat. No. 3,803,409. In its simplest form, this type of fastener includes a coupling having one or more outwardly extending projections or lugs, and a rotatable, female socket having a spiral slot therein for receiving the lugs. The coupling may include an integral mounting plate for affixing the connector to a connection module, as shown in U.S. Pat. No. 3,947,182, or the coupling may comprise a double-ended receptacle which mates with two female sockets (one on each end of the fiber) as depicted in U.S. Pat. No. 3,948,582. A further improvement relates to the manner in which the female socket is rotated about the coupling. It was found that such rotation could result in undesirable grinding of the fiber end faces during the connection operation. To prevent such grinding, the connector body (ferrule) may be provided with means for aligning the ferrule with the connector receptacle, as suggested in U.S. Pat. Nos. 4,272,154, 4,354,731, and 4,793,683.

Such alignment means has been combined with a bayonet style fastener in U.S. Pat. No. 4,634,214. This connector is identified as an "ST" connector ("ST" is a trademark of American Telephone and Telegraph Co.), and an exemplary embodiment thereof is shown in FIG. 1. The prior art ST connector generally comprises a double-ended receptacle 1 which accommodates two plugs 2 (only one of which is depicted in FIG. 1) attached to the fiber ends. Each tubular end of receptacle 1 has a guide slot 3 which receives a guide stud 4 attached to the ferrule support of plug z; these elements prevent rotation of the ferrule with respect to the receptacle, which could otherwise damage the fiber end faces. Receptacle 1 also has diametrically opposed lugs 6 which slide into spiral or J-shaped slots 7 on the bayonet cap 8 of plug 2. Cap 8 is coupled to ferrule 5 in such a manner that cap 8 is free to rotate with respect to ferrule 5. An alignment sleeve (not shown) for the ferrules is also typically provided within receptacle 1. Additional features have been added to this basic ST design, such as the boot/cap extender shown in U.S. Pat. No. 4,812,009.

Although the ST connector is fairly simple to use, it still has several disadvantages. The first relates to the requirement that the cap 8 be manually rotated to effect the connection to receptacle 1. This precludes use of an ST connector in high density environments where there is insufficient room to manipulate cap s. The requirement of relative rotation between cap s and receptacle 1 also prevents ganging of connectors, i.e., the incorporation of multiple connectors into a single housing, such as the duplex fiber optic connectors illustrated in U.S. Pat. Nos. 4,762,388, 4,611,887, and 4,687,291, which are being installed in greater numbers for use in fiber distributed data integration (FDDI).

Instead of bayonet fastening, duplex connectors typically utilize latching mechanisms to engage the connector receptacles and plugs. Latch arms are also used to achieve a snap-lock in several simplex connector designs, including those disclosed in U.S. Pat. Nos. 4,225,214 and 4,240,695. Unfortunately, most of these designs still require manipulation of actuation arms to allow the latches to release, and therefore suffer from the same limitation as ST connectors regarding high density connection environments. One interesting latch design, however, overcomes this problem in a quick-release, push-pull type fiber optic connector. An example of such a connector is shown in U.S. Pat. No. 4,268,115. In this design, a slidable housing surrounds the connector plug body, the body having attached thereto and integral therewith two latches which engage an annular groove in the connector receptacle. When the housing slides over the connector body, away from the receptacle, two apertures in the housing contact the latch hooks and cause them to be released from the annular groove.

A similar push-pull fiber optic connector which is in wide use today is known as the "SC" connector, first manufactured by Nippon Telegraph and Telephone Co. (NTT) of Tokai, Japan. An exemplary embodiment of this connector is shown in FIG. 2. A more detailed description may be found in "Japanese Industrial Standard JIS C 5973 for F04-type optical fiber connectors," published by the Japanese Standards Association. This design also utilizes a double-ended receptacle 10, but both the receptacle and the plug 11 have a rectangular cross-section. Plug 11 includes a ferrule holder 12 which holds the ferrule 13. Ferrule holder 12 has notches 14 therein which engage with hooks 15 of latches 16 which are part of receptacle 10. Plug 11 further includes a slidable housing 17 surrounding ferrule holder 12. Housing 17 has slots 18 formed therein, which have side ramps 19 at their forward end. When plug 11 is inserted into receptacle 10, hooks 15 engage notches 14. Pulling on the fiber optic cable will not disengage the elements, since the cable is directly attached to a backbone which is coupled only to ferrule holder 12; however, if housing 17 is pulled away from receptacle 10, ramps 19 come into contact with the forward side extensions of latches 16, raising the latches and disengaging hooks 15 from notches 14.

Although the SC design offers several advantages over the ST design, the two connectors are totally incompatible. Moreover, there are already several million ST connectors in use, and this number is quickly approaching ten million. It would, therefore, be desirable and advantageous to devise a push-pull type fiber optic connector having the advantages of the SC connector, but which is fully compatible with the ST design and which could therefore be used on existing ST receptacles.

SUMMARY OF THE INVENTION

The foregoing objective is achieved in a push-pull optical fiber connector comprising a connector backbone attached to the strength member of the fiber optic cable, the backbone having latching means for attachment to the bayonet lugs of ST-type receptacles, and a slidable shell or housing surrounding the backbone which has means for disengaging the latching means from the lugs when the housing is moved away from the ST receptacle. The housing further has slots or cavities therein allowing the latching means to flex away from the center of the connector.

A ferrule may be directly attached to the backbone, but it is more preferable to attach the ferrule to a ferrule holder which is coupled to the backbone in such a manner as to allow slight relative movement between the backbone and the ferrule holder. The backbone advantageously includes a keying stud to align the connector with the ST receptacle, and a keying guide to align the backbone with the ferrule holder. A boot may also be attached to the housing to provide additional strain relief and to facilitate the sliding of the housing.

BRIEF DESCRIPTION OF THE DRAWINGS

The novel features and scope of the invention are set forth in the appended claims. The invention itself, however, will best be understood by reference to the accompanying drawings, wherein:

FIG. 4 is a horizontal section view of the optical fiber connector of the present invention taken along lines 4—4 of FIG. 3;

FIG. 5 is a front elevational view of the optical fiber connector of the present invention; and FIG. 6 is a top plan view of a duplex optical fiber connector made in accordance with the present invention.

DESCRIPTION OF THE PREFERRED EMBODIMENT

Figure 3:
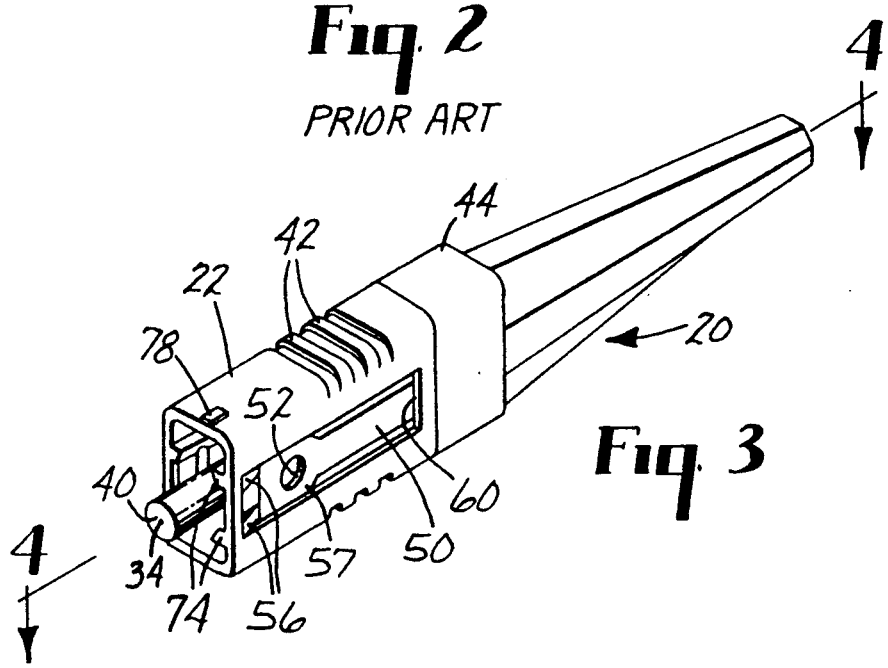
FIG. 3 is a perspective view of the push-pull optical fiber connector of the present invention.

With reference now to the figures, and in particular with reference to FIGS. 3 and 4, there is depicted the push-pull optical fiber connector 20 of the present invention. Optical fiber connector 20 is generally comprised of an exterior housing 22 which is slidably mounted over a hollow, cylindrical member or backbone 24. In the preferred embodiment, housing 22 has a generally rectangular or square cross-section, while backbone 24 has a circular cross-section (as shown in FIG. 5). As shown in FIG. 4, the strength member 26 of a fiber optic cable 28, usually a Kevlar wrap ("Kevlar" is a trademark of E. I. DuPont deNemours & Co.), is exposed and secured to the proximate end of backbone 24 by means of a metallic clamp 30. The outer surface of the proximate end of backbone 24 may be provided with a series of knurls or ridges 32 to enhance the gripping action of clamp 30. The optical fiber 34, including its cladding and buffer 36, passes through backbone 24, into a passageway in ferrule holder 38, and terminates within a ferrule 40 fixedly attached to ferrule holder 38. Although ferrule 40 could be directly attached to backbone 24, it is desirable to allow some relative movement between ferrule 40 and backbone 24, as explained further below.

Housing 22, backbone 24 and ferrule holder 38 may be constructed of any durable material. Although polymeric materials are preferred, metallic materials may also be used, or combinations thereof. Suitable materials for housing 22, backbone 24 and ferrule holder 38 include liquid crystal polymers, polyether sulfone (PES), polycarbonate (commercially known as LEXAN), polybutylene terephtalate (PBT), polyphenylene sulfide (PPS), polyether ether ketone (PEEK), and polyether imide (PEI). Ferrule 40 may be constructed from a wide variety of materials, such as metals and polymers, and particularly ceramics; zirconia is preferred. The outer surface of housing 22 may be provided with ridges/-grooves 42 to assist gripping of the housing. A boot 44 (preferably constructed of a thermoplastic elastomer such as polyurethane) may be attached to housing 22 by means of interlocking flanges 46 and 48. Boot 44 provides additional strain relief and facilitates manual sliding of housing 22.

Figure 1:
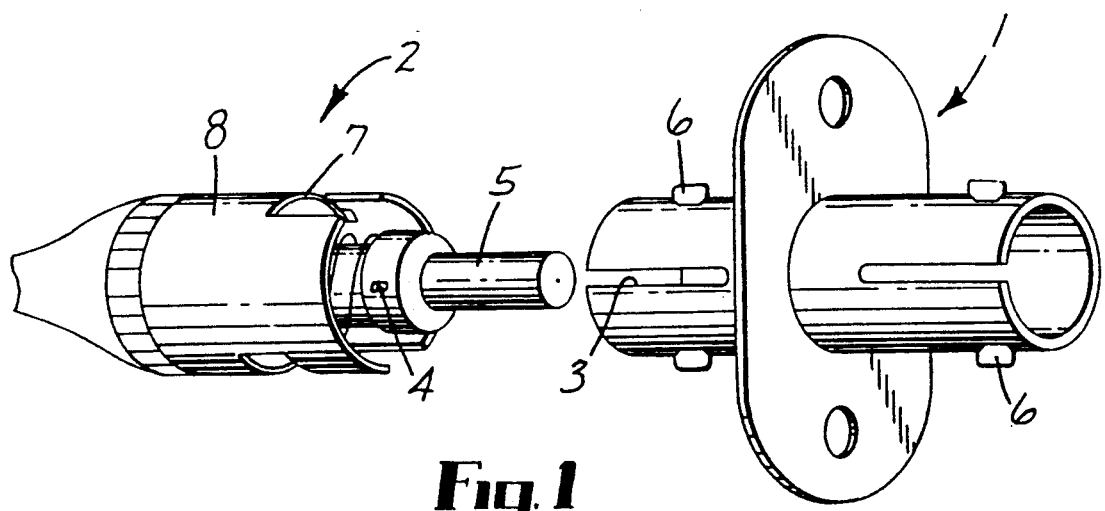
FIG. 1 is a perspective view of the prior art ST fiber optic connector.
Figure 2:
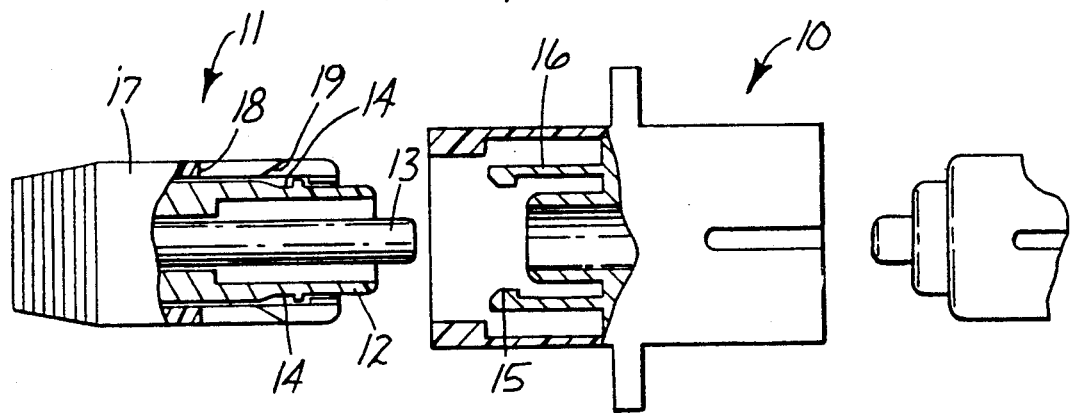
FIG. 2 is a side elevational view in partial section of the prior art SC fiber optic connector.

The primary novelty in the present invention relates to the manner in which connector 20 is attached to, and detaches from, an ST-type receptacle such as the receptacle 1 shown in FIG. 1. This is accomplished by providing two diametrically opposed latch arms 50 which are attached (in a hinge-like manner) to, aligned with, and preferably integral with, backbone 24. Each latch 50 has an aperture 52 therein for receiving the lugs 6 on the tubular ends of ST receptacle 1. A beveled surface is provided at the leading edge 54 of each latch arm 50 whereby, as connector 20 is inserted into receptacle 1, lugs 6 contact beveled edges 54, flexing latch arms 50 away from backbone 24 and allowing lugs 6 to slide under latch arms 50 until they are positioned under apertures 52, at which time latch arms 50 snap back to their original, relaxed position. To this end, latch arms 50 should be constructed of a flexible and slightly elastic material, such as the previously mentioned PES, PBT or polycarbonate. Flexing may occur along the length of latch arms 50, or just at the hinge between latch arms 50 and backbone 24.

Those skilled in the art will appreciate that, at this point, any pulling force exerted on cable 28 will be transferred directly to the latch arm/lug interface by virtue of strength member 26 being attached to backbone 24 which is integral with latch arms 50. Thus, connector 20 cannot be disconnected by pulling on cable 28 (or by pushing any components). Connector 20 may, however, be disengaged from ST receptacle 1 by simply pulling on housing 22 (or boot 44). Housing 22 has ramp surfaces 56 at its distal end, adjacent wings 57 (shown in FIG. 3 but only slightly visible in FIG. 5) which extend sideways from the leading edges 54 of latch arms 50. When pulled away from receptacle 1, housing 22 slides over backbone 24, and ramp surfaces 56 push against wings 57, raising latch arms 50 and disengaging receptacle lugs 6 from apertures 52. Continued pulling on housing 22 results in removal of connector 20 as housing 22 makes forcible contact with latch arms 50 at surfaces 58. It will be noted that space must be provided adjacent latch arms 50 to allow the arms to flex away from backbone 24. Housing 22 is thus provided with slots 60 to accommodate arms 50 as they flex. Of course, the walls of housing 22 could be thicker in which case a cavity or groove (rather than slots extending the full thickness of the walls) would suffice to allow space for latch arms 50.

Side pull resistance is also provided by attaching two generally parallel legs 61 to the outer surface of backbone 24, reducing the effect of lateral forces which are applied to cable 28. Side pull resistance is enhanced by the manner in which legs 61 bear against the exterior of receptacle 1 in cooperation with backbone 24 bearing against the interior of receptacle 1. Legs 61 have arcuate surfaces 63 which conform to the outer shape and dimensions of the tubular end of receptacle 1. Legs 61 also provide alignment between backbone 24 and housing 22.

As mentioned above, it is also desirable to allow some relative movement between ferrule 40 and backbone 24, in order to prevent the direct application of tension or lateral forces on fiber 34. In the present invention, this is accomplished by allowing ferrule holder 38 to slide within backbone 24, and by further providing a helical spring 62 which biases ferrule holder 38 in a forward, extended direction. At one end, spring 62 abuts an enlarged portion 64 of ferrule holder 38, while the other end abuts an inwardly extending flange or annular shoulder 66 of backbone 24. In this manner, any pulling forces exerted on cable 28 are not felt by ferrule holder 38 (or ferrule 40) since they are transferred to backbone 24 via Kevlar wrap 26 and clamp 30, and the end faces of the ferrules within the receptacle remain in forcible contact due to the biasing spring in each connector.

This construction, however, presents two problems. First of all, it is difficult to precisely thread the buffered fiber 36 into the proximate end 68 of ferrule holder 38 due to the distance between proximate end 68 and the opening of backbone 24. Secondly, it is important that clamp 30 exert a strong gripping force against Kevlar wrap 26, but the thin walls of backbone 24 make it vulnerable to collapse if clamp 30 is too tight; due to manufacturing considerations (namely, molding requirements to provide shoulder 66 within backbone 24) the walls of backbone 24 cannot be an thicker at the clamping end. Both of these problems are solved, however, by the use of a bushing 70 inserted within backbone 24 in the vicinity of clamp 3 and adjacent proximate end 68 of ferrule holder 38. Bushing 70 serves as an alignment guide to insure that the buffered fiber 36 properly enters proximate end 68 of ferrule holder 38, and it also imparts structural integrity to the walls of backbone 24 at its clamping end. Bushing 70 preferably has an annular ridge 72 which fits in a corresponding groove in the inside wall of backbone 24.

Bushing 70 also has a passageway of sufficient diameter to allow some bowing of buffered fiber 36 therein, due to the minor axial translation of ferrule 40 which occurs when two such ferrules forcibly abut each other within receptacle 1. Ferrule holder 38 is prevented from moving to far into backbone 24 by a stop 71 which abuts the end of backbone 24. In this regard, the length and position of ferrule 40 is such that ferrule 40 extends about 0.5 mm beyond the intended plane of contact within receptacle 1. This tolerance, along with an appropriately chosen spring constant for spring 62, propvides a force of about 9 newtons at the ferrule-to-ferrule interface as required by ST design specifications.

Referring now to FIG. 5, several other features of optical fiber connector 20 may be seen. A plurality of inwardly projecting fingers 74 are integrally formed with housing 22 to help guide one of the cylindrical ends of receptacle 1 into connector 20. The ends of guide fingers 74 are curved to conform to the circular cross-section of receptacle 1. Ramp surfaces 56 of housing 22 are hidden behind fingers 74 in FIG. 5. Also, an outwardly extending guide stud 76 is integrally formed on the surface of backbone 24 to mate with the guide slot 3 on the ST receptacle. Finally, the outer visible surface of housing 22 may bear a mark or raised boss 78 to apprise the user of the proper orientation of connector 20, with respect to guide stud 76.

In addition to the keying provided between receptacle 1 and backbone 24, there is also provided keying means for preventing relative rotation or twisting between ferrule holder 38 and backbone 24. Backbone 24 is provided with another guide slot so which mates with a spline 82 formed on the outer surface of ferrule holder 38. This keying, along with that provided by guide stud 76 and guide slot 3, insures that ferrule 40 will not rotate with respect to receptacle 1, preventing abrasive damage that might otherwise occur when two fiber end faces abut each other within receptacle 1, and also prevents inadvertent twisting of ferrule 40 when not engaged.

FIG. 6 illustrates how the present invention may be incorporated into a duplex connector. In this embodiment, a single housing 22, fits over the backbones of two connector subassemblies 20a and 20b. Sliding motion of housing 22' causes the internal latch arms (not shown) in subassemblies 20a and 20b to disengage from the receptacle lugs. Alternatively, housing 22' could comprise a clamshell-type assembly which would simply fit over two complete connectors 20 each having slidable housings 22. Ridges 42 formed on the outer surface of housing 22 may be used to help secure such a clamshell assembly.

Although the optical fiber connector of the present invention could be practically any size, it is primarily intended for use with existing ST receptacles. Accordingly, connector 20 should have the following approximate dimensions. The outer diameter of that portion of backbone 24 which is surrounded by the ST receptacle is about 5.3 mm. The inner diameter of backbone 24 is about 3.6 mm. Bushing 70 is correspondingly about 3.4 mm in diameter, although it is slightly tapered for a force-fit within backbone 24, and is about 11.0 mm in length. Latch arms 50 have a length of about 13.0 mm and a width of about 2.7 mm. The width of latch arms 50 across wings 57 which engage ramp surfaces 56 is about 4.8 mm. The diameter of apertures 52 in latch arms 50 is about 1.8 mm. The exterior dimensions of housing 22 are not relevant to ST compatibility, but housing 22 should be as small as practicable to allow high density interconnections; housing 22 is preferably about 10.9 mm square. Boot 44 is preferably about 2.8 cm long.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that the appended claims will cover such modifications that fall within the true scope of the invention.

I claim:

1. An optical fiber connector comprising:
   a hollow, generally cylindrical member having first and second ends;
   ferrule means for terminating the optical fiber, said ferrule means being located within said cylindrical member proximate said first end;

latch means for engaging one or more lugs on a receptacle, said latch means being attached to said cylindrical member proximate said first end; and housing means slidably attached to said cylindrical member, said housing means having ramp means for disengaging said latch means from the lugs as said housing means is moved toward said second end of said cylindrical member.

2. The optical fiber connector of claim 1 wherein said latch means comprises two generally parallel latch arms attached to and aligned with said cylindrical member, each of said latch arms having an aperture therein for receiving one of the lugs.

3. The optical fiber connector of claim 1 wherein:
said cylindrical member includes stud means for aligning said cylindrical member with a guide slot in the receptacle; and
said ferrule means includes spline means for aligning said ferrule means with a guide slot in said cylindrical member.

4. The optical fiber connector of claim 1 further comprising means for clamping a strength member associated with the optical fiber to said second end of said cylindrical member.

5. The optical fiber connector of claim 1 further comprising means for allowing relative movement between said ferrule means and said cylindrical member.

6. The optical fiber connector of claim 1 wherein said housing means surrounds said cylindrical member and has one or more slots for accommodating said latch means, and further comprising leg members attached to said cylindrical member for aligning said cylindrical member inside said housing means and for providing resistance against lateral forces acting on the optical fiber.

7. The optical fiber connector of claim 2 wherein said ramp means comprises a plurality of ramp surfaces attached to said housing means, each of said ramp surfaces being proximate to and generally facing a leading edge of one of said latch arms.

8. The optical fiber connector of claim 4 further comprising bushing means located within said cylindrical member proximate said second end thereof for aligning the optical fiber with said ferrule means.

9. The optical fiber connector of claim 5 further comprising means for biasing said ferrule means away from said second end of said cylindrical member.

10. An article for connecting and disconnecting an optical fiber to a receptacle having a tubular end, the outer surface of the tubular end having two diametrically opposed, outwardly projecting bayonet lugs, the article comprising:
a hollow, generally cylindrical backbone having inner and outer surfaces, and first and second ends;
means for clamping a strength member of the optical fiber around a portion of said outer surface of said backbone proximate said second end thereof;
ferrule means for terminating the optical fiber, said ferrule means being located within said backbone proximate said first end thereof;
two diametrically opposed, flexible latch arms attached to and integral with said backbone, and generally aligned with said backbone, each of said latch arms having an aperture therein for receiving one of the lugs, and extending toward said first end of said backbone; and
a housing surrounding and slidably attached to said backbone, having a generally rectangular cross section and two slots in opposing walls of said housing, each of said slots being adjacent to and aligned with one of said latch arms, said housing further having ramp means for disengaging said latch arms from the lugs as said housing is moved toward said second end of said backbone.

11. The article of claim 10 further comprising:
stud means attached to said outer surface of said backbone for aligning said backbone with a guide slot on the tubular end of the receptacle; and
spline means attached to said ferrule means for aligning said ferrule means with a guide slot in said backbone.

12. The article of claim 10 further comprising means for allowing relative movement between said ferrule means and said backbone.

13. The article of claim 10 wherein:
each of said latch arms has a leading edge and a beveled surface at said leading edge; and
said ramp means comprises a plurality of ramp surfaces attached to said housing, each of said ramp surfaces being proximate to and generally parallel with one of said beveled surfaces.

14. The article of claim 10 further comprising:
leg means attached to said backbone for aligning said backbone inside said housing and for providing resistance against lateral forces acting on the optical fiber; and
boot means attached to said housing for providing strain relief to the optical fiber and for facilitating sliding actuation of said housing.

15. The article of claim 12 further comprising:
bushing means located within said backbone proximate said second end thereof for aligning the optical fiber with a passageway in said ferrule means; and
means for biasing said ferrule means away from said second end of said backbone.

16. An optical fiber connector comprising:
a hollow backbone member having inner and outer surfaces, and first and second ends;
means for clamping a strength member of the optical fiber around a portion of said outer surface of said backbone proximate said second end thereof;
a ferrule for terminating the optical fiber, said ferrule being located within said backbone proximate said first end thereof;
means for allowing relative movement between said ferrule and said backbone;
bushing means located within said backbone proximate said second end thereof for aligning the optical fiber with a passageway in said ferrule; and
means for biasing said ferrule away from said second end of said backbone.

17. The optical fiber connector of claim 16 wherein:
said inner surface of said backbone has an annular groove proximate said second end thereof;
said bushing means comprises a bushing insert having an outer diameter which is approximately equal to the inner diameter of said backbone, said bushing insert being located within said backbone proximate said clamping means, and further having an annular ridge which fits into said annular groove in said inner surface of said backbone.

18. The optical fiber connector of claim 16 wherein:
said inner surface of said backbone proximate said first end thereof has formed thereon an annular shoulder;

said means for allowing relative movement between said ferrule and said backbone comprises a ferrule holder having first and second ends and an enlarged portion near said first end, said ferrule being affixed to said first end of said ferrule holder, and said ferrule holder being slidably positioned in said first end of said backbone; and said biasing means comprises a helical spring having first and second ends, surrounding a portion of said ferrule holder, said first end of said spring abutting said enlarged portion of said ferrule holder, and said second end of said spring abutting said annular shoulder of said backbone.

19. The optical fiber connector of claim 16 further comprising:

latch means for engaging one or more lugs on a receptacle, said latch means being attached to said backbone proximate said first end thereof; and housing means slidably attached to said backbone, said housing means having ramp means for disengaging said latch means from the lugs as said housing means is moved toward said second end of said backbone.

20. The optical fiber connector of claim 19 wherein:

said latch means comprises two generally parallel latch arms attached to and aligned with said cylindrical member, each of said latch arms having an aperture therein for receiving one of the lugs;

said housing means has two slots for accommodating said latch arms; and said ramp means comprises a plurality of ramp surfaces attached to said housing means, each of said ramp surfaces being proximate to and generally facing a leading edge of one of said latch arms.

* * * * *